(12) United States Patent
Hughes

(10) Patent No.: US 8,038,779 B2
(45) Date of Patent: Oct. 18, 2011

(54) METHODS AND APPARATUS FOR REDUCING EMISSIONS IN AN INTEGRATED GASIFICATION COMBINED CYCLE

(75) Inventor: Terry Hughes, Jersey Village, TX (US)

(73) Assignee: General Electric Company, Schenectady, NY (US)

( * ) Notice: Subject to any disclaimer, the term of this patent is extended or adjusted under 35 U.S.C. 154(b) by 1114 days.

(21) Appl. No.: 11/470,679

(22) Filed: Sep. 7, 2006

(65) Prior Publication Data
US 2008/0060521 A1 Mar. 13, 2008

(51) Int. Cl.
*B01D 53/14* (2006.01)
(52) U.S. Cl. ............... 96/234; 95/159; 95/169; 95/199; 48/128
(58) Field of Classification Search .............. 95/159, 95/169, 171, 235; 96/234; 266/154, 156, 266/171; 423/574 R
See application file for complete search history.

(56) References Cited

U.S. PATENT DOCUMENTS

| | | | | |
|---|---|---|---|---|
| 3,864,460 | A * | 2/1975 | Connell | 423/574.1 |
| 4,085,199 | A * | 4/1978 | Singleton et al. | 423/574.1 |
| 4,124,685 | A * | 11/1978 | Tarhan et al. | 423/574.2 |
| 4,242,108 | A * | 12/1980 | Nicholas et al. | 95/166 |
| 4,461,749 | A * | 7/1984 | Thorn | 423/228 |
| 4,526,764 | A * | 7/1985 | Stehning | 423/243.03 |
| 4,769,229 | A * | 9/1988 | McGalliard | 423/574.1 |
| 4,785,622 | A | 11/1988 | Plumley et al. | |
| 4,853,012 | A * | 8/1989 | Batteux et al. | 95/174 |
| 5,081,845 | A | 1/1992 | Allam et al. | |
| 5,240,476 | A * | 8/1993 | Hegarty | 95/161 |
| 5,421,166 | A | 6/1995 | Allam et al. | |
| 5,474,682 | A * | 12/1995 | Buisman | 210/610 |
| 5,597,402 | A * | 1/1997 | LaPack et al. | 95/12 |
| 5,740,673 | A | 4/1998 | Smith et al. | |
| 5,901,547 | A | 5/1999 | Smith et al. | |
| 5,953,899 | A | 9/1999 | Rao et al. | |
| 6,149,859 | A * | 11/2000 | Jahnke et al. | 266/154 |
| 6,216,436 | B1 | 4/2001 | Ranasinghe et al. | |
| 6,362,335 | B2 * | 3/2002 | Emonds et al. | 544/263 |
| 6,432,368 | B1 | 8/2002 | Feitelberg et al. | |
| 6,464,875 | B1 * | 10/2002 | Woodruff | 210/603 |
| 6,513,317 | B2 | 2/2003 | Arar et al. | |
| 6,519,945 | B2 | 2/2003 | Arar et al. | |
| 6,709,592 | B2 * | 3/2004 | van Groenestijn et al. | 210/603 |
| 6,824,575 | B1 | 11/2004 | Otomo et al. | |
| 7,137,257 | B2 | 11/2006 | Drnevich et al. | |
| 7,374,051 | B2 * | 5/2008 | Garceau | 211/63 |
| 2002/0134706 | A1 * | 9/2002 | Keller et al. | 208/250 |
| 2009/0092524 | A1 * | 4/2009 | Ravikumar et al. | 422/171 |

* cited by examiner

*Primary Examiner* — Duane Smith
*Assistant Examiner* — Ives Wu
(74) *Attorney, Agent, or Firm* — Armstrong Teasdale LLP

(57) ABSTRACT

A method of assembling a gas removal system for an integrated gasification combined cycle is provided. The method includes coupling a first rich solvent tank in flow communication with the integrated gasification combined cycle to store a first emissions-rich solvent discharged from the integrated gasification combined cycle and coupling a first stripper in flow communication with the first rich solvent tank to facilitate removing gases from the first emissions-rich solvent. The method also includes coupling an absorber in flow communication with the first stripper to receive gases from the first stripper and create a second emissions-rich solvent and coupling a second rich solvent tank in flow communication with the absorber to store the second emissions-rich solvent.

11 Claims, 3 Drawing Sheets

METHODS AND APPARATUS FOR REDUCING EMISSIONS IN AN INTEGRATED GASIFICATION COMBINED CYCLE

BACKGROUND OF THE INVENTION

This invention relates generally to integrated gasification combined cycles (IGCC) and, more particularly, to an acid gas removal (AGR) system to be used with an IGCC.

At least some known integrated gasification combined cycles use gasification to breakdown biomass feedstock to create synthetic gas (syngas) for use in a turbine engine. Moreover, steam produced during operation of the IGCC is used to operate a steam turbine. As such, known IGCCs can operate at efficiencies approaching 60%. After gasification, known IGCCs generally use an acid gas removal system to remove sulfur from the syngas created in the gasifier, thereby creating a low sulfur syngas that may be useable in the turbine engine.

More specifically, to remove sulfur from the syngas, at least some known IGCCs couple an absorber downstream from the gasifier. The absorber contains a solvent capable of absorbing hydrogen sulfide and carbonyl sulfide from the syngas, such that a sulfur-rich solvent is created. The sulfur-rich solvent is delivered to a stripper, wherein acid gases are removed from the solvent such that a sulfur-lean solvent can be recirculated to the absorber. The acid gases are then channeled to a sulfur recovery unit wherein a usable sulfur product is produced along with gases which can be recirculated to the gasifier.

At least some known acid gas removal systems may be incapable of meeting current emissions requirements during all operating conditions. For example, high sulfur start-up fuels may produce a large quantity of emissions. While many of the emissions generated are captured during the acid gas removal process, at least some emissions may be released into the atmosphere during system shutdowns, equipment failures, or sulfur recovery unit trips.

One known method to facilitate reducing emissions is to utilize low sulfur start-up fuels or methanol. However, such systems generally require additional inventory and handling equipment, which increase the costs associated with the IGCC. Other known systems include a start-up absorber to facilitate absorbing the syngas immediately following gasification. However, the solvents used in such an absorber typically operate at a low temperature and require low temperature syngas. As such, a start-up absorber is infeasible in at least some known systems. Moreover, known start-up absorbers are only capable of reducing emissions upstream from the acid gas removal system, but in many systems, emissions may be generated downstream from the acid gas removal system.

BRIEF DESCRIPTION OF THE INVENTION

In one aspect, a method of assembling a gas removal system for an integrated gasification combined cycle is provided. The method includes coupling a first rich solvent tank in flow communication with the integrated gasification combined cycle to store a first emissions-rich solvent discharged from the integrated gasification combined cycle and coupling a first stripper in flow communication with the first rich solvent tank to facilitate removing gases from the first emissions-rich solvent. The method also includes coupling an absorber in flow communication with the first stripper to receive gases from the first stripper and create a second emissions-rich solvent and coupling a second rich solvent tank in flow communication with the absorber to store the second emissions-rich solvent.

In another aspect, a gas removal system for an integrated gasification combined cycle is provided. The gas removal system includes a first rich solvent tank configured to store a first emissions-rich solvent discharged from the integrated gasification combined cycle and a first stripper configured to facilitate removing gases from the first emissions-rich solvent. The gas removal system also includes an absorber configured to receive gases removed from the first emissions-rich solvent to create a second emissions-rich solvent and a second rich solvent tank configured to store the second emissions-rich solvent.

In a further aspect, an integrated gasification combined cycle is provided. The integrated gasification combined cycle includes a gasifier and a gas removal system including a first rich solvent tank configured to store a first emissions-rich solvent discharged from the integrated gasification combined cycle and a first stripper configured to facilitate removing gases from the first emissions-rich solvent. The gas removal system also includes an absorber configured to receive gases removed from the first emissions-rich solvent to create a second emissions-rich solvent and a second rich solvent tank configured to store the second emissions-rich solvent.

DETAILED DESCRIPTION OF THE INVENTION

As used herein, "lean" is used to describe a solvent or syngas that is substantially emissions free. "Rich" is used to describe a solvent or syngas containing emissions.

Figure 1:
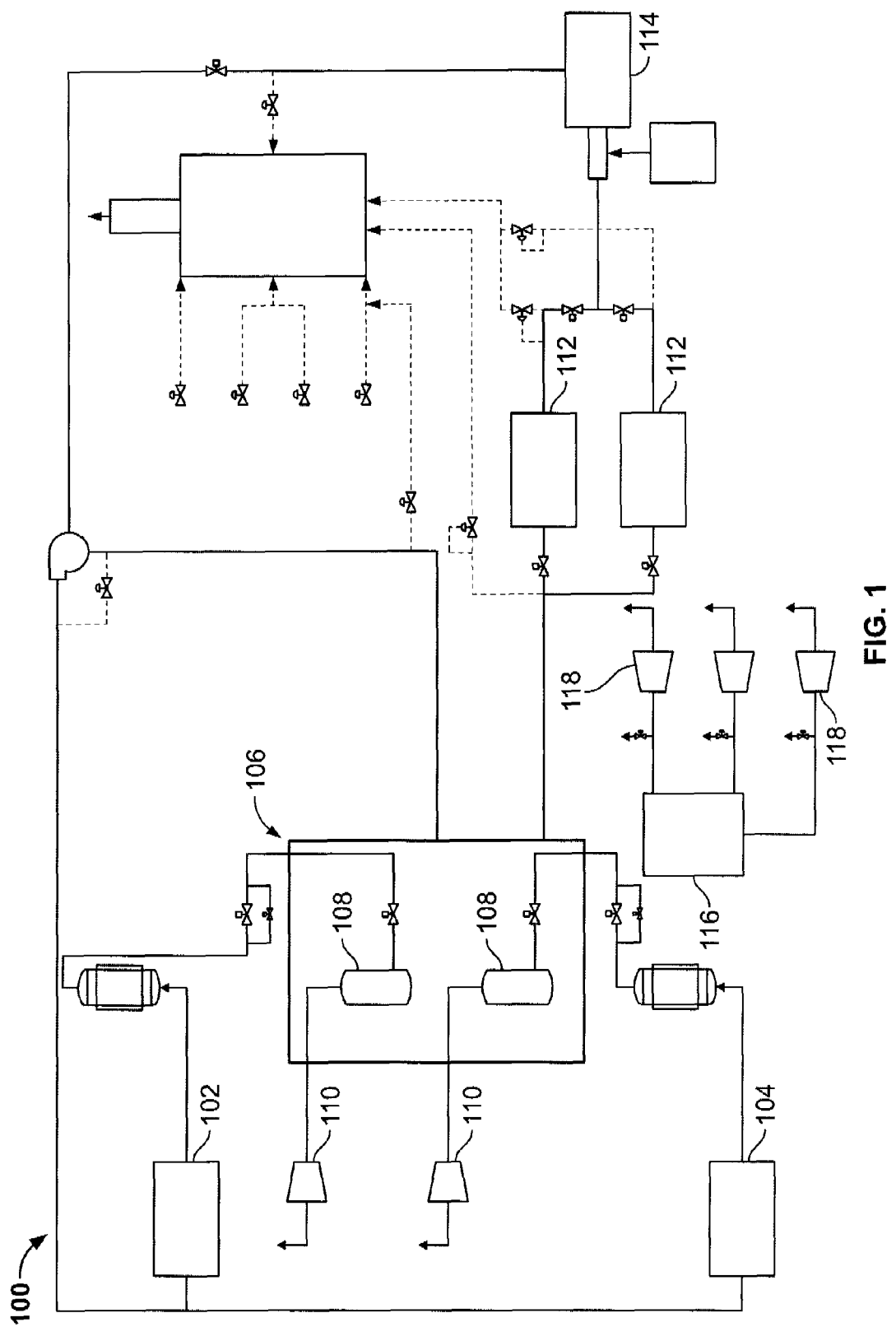
FIG. 1 is a schematic of a known exemplary integrated gasification combined cycle (IGCC) system.

FIG. 1 is a schematic of an exemplary integrated gasification combined cycle (IGCC) 100. IGCC 100 includes a first gasification train 102 and a second gasification train 104. Each gasification train 102 and 104 is coupled in flow communication with an acid gas removal (AGR) system 106. AGR 106 includes a pair of absorbers 108 that are each coupled in flow communication with gasification train 102 or gasification train 104. At least one combustion turbine 110 is coupled downstream from AGR 106. In the exemplary embodiment, two turbine engines 110 are coupled downstream from AGR 106. Furthermore, at least one sulfur recovery unit (SRU) 112 is coupled downstream from AGR 106. In the exemplary embodiment, two SRUs 112 are coupled downstream from AGR 106. A tail gas treating unit (TGTU) 114 is coupled in flow communication with at least one SRU 112. In the exemplary embodiment, TGTU is coupled in flow communication to both SRUs 112.

During operation, gasification trains 102 and 104 create an emissions-rich synthetic gas (syngas), which is channeled to each respective absorber 108. Within absorbers 108, the syngas is mixed with an emissions-lean first solvent to facilitate removing emissions. In the exemplary embodiment, the emissions-lean first solvent is Selexol, which is used to remove hydrogen sulfide and carbonyl sulfide from the syngas. In alternative embodiments, various different solvents are used to remove other chemical emissions. Within absorber 108, the emissions-lean first solvent is placed in contact with the emissions-rich syngas at high pressures and low temperatures. At these pressures and temperatures, the solvents high solubility for emissions causes the emissions to be absorbed into the solvent, such that an emissions-lean syngas is produced. The emissions-lean syngas is channeled to at least one turbine 110 and used to facilitate combustion within each turbine 110 to generate power. Heat from the combustion of emissions lean syngas in each turbine 110 is recovered to generate steam which is channeled to a steam turbine 118 to produce additional power. As such, integrated gasification combined cycle 100 uses gasification to operate both a turbine engine and a steam turbine.

In addition to producing emissions-lean syngas, absorber 108 also produces an emissions-rich solvent. Prior to leaving AGR 106, the emissions-rich solvent is stripped to produce gases and an emissions-lean solvent. Specifically, a stripper (not shown) uses heat from steam to heat the emissions-rich solvent causing the emissions to be released from the emissions-rich solvent as gases. The resultant emissions-lean solvent is recycled to absorbers 108 and the gases are discharged into at least one SRU 112. Within each SRU 112 receiving gases, the gases undergo a chemical reaction which produces sulfur and tail gases. The sulfur can be removed and used for any industrial purpose and the tail gases are discharged into TGTU 114. The treated tail gas leaving the TGTU is either recycled back into gasification trains 102 and 104, or reabsorbed in the first or second absorbers.

The above-described process is utilized to remove gases, in particular sulfur gases, from the syngas while producing low emissions. However the above-described apparatus may be subject to equipment failures and shutdown operations. During an equipment failure, in particular an SRU trip, or a shutdown, the above-described system may release higher emissions into the atmosphere.

Figure 2:
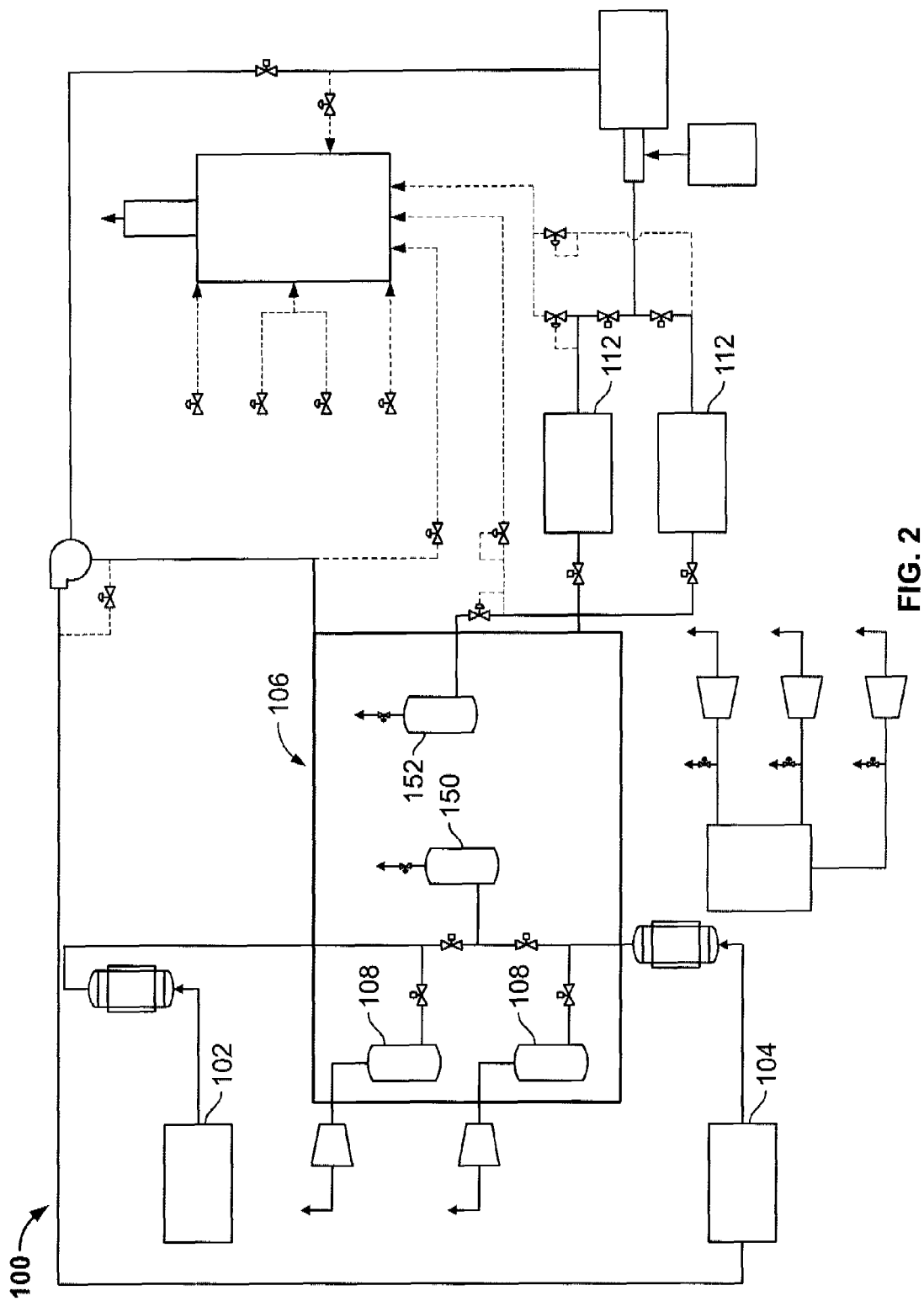
FIG. 2 is a schematic of the IGCC system shown in FIG. 1 and including a variable pressure start-up absorber and a low pressure re-absorber.

FIG. 2 is a schematic of IGCC 100 including a variable pressure start-up absorber 150 and a low pressure re-absorber 152. Specifically, variable pressure start-up absorber 150 is coupled downstream from, and in flow communication with, gasification train 102 and gasification train 104. Low pressure re-absorber 152 is coupled in flow communication with AGR 106 such that gases discharged from AGR 106 can be circulated to low pressure re-absorber 152.

Prior to operation, variable pressure absorber 150 circulates at an atmospheric pressure. Because of the low pressure within variable pressure absorber 150, emissions-rich start-up gases can be introduced immediately from gasification trains 102 and 104 during start up operating conditions. Syngas produced is channeled through variable pressure absorber 150, wherein emissions-rich solvent is produced. The emissions-rich solvent flows through AGR 106 wherein it is stored and later stripped to produce gases. Gases produced are then channeled to either at least one SRU 112 or to low pressure re-absorber 152 wherein fluid contact with a second solvent stream is used to remove further emissions. In the exemplary embodiment, the second solvent used is methyl diethanol amines (MDEA), however other solvents may be substituted for improved absorption efficiencies at lower pressures. Low pressure re-absorber 152 produces an emissions-rich solvent which is later stripped to produce additional gases. These gases can either be recycled through low pressure re-absorber 152 or can be channeled to at least one SRU 112 for further processing as described above. The significance of variable pressure absorber 150 and low pressure re-absorber 152 may be better understood by the illustration in FIG. 3.

Figure 3:
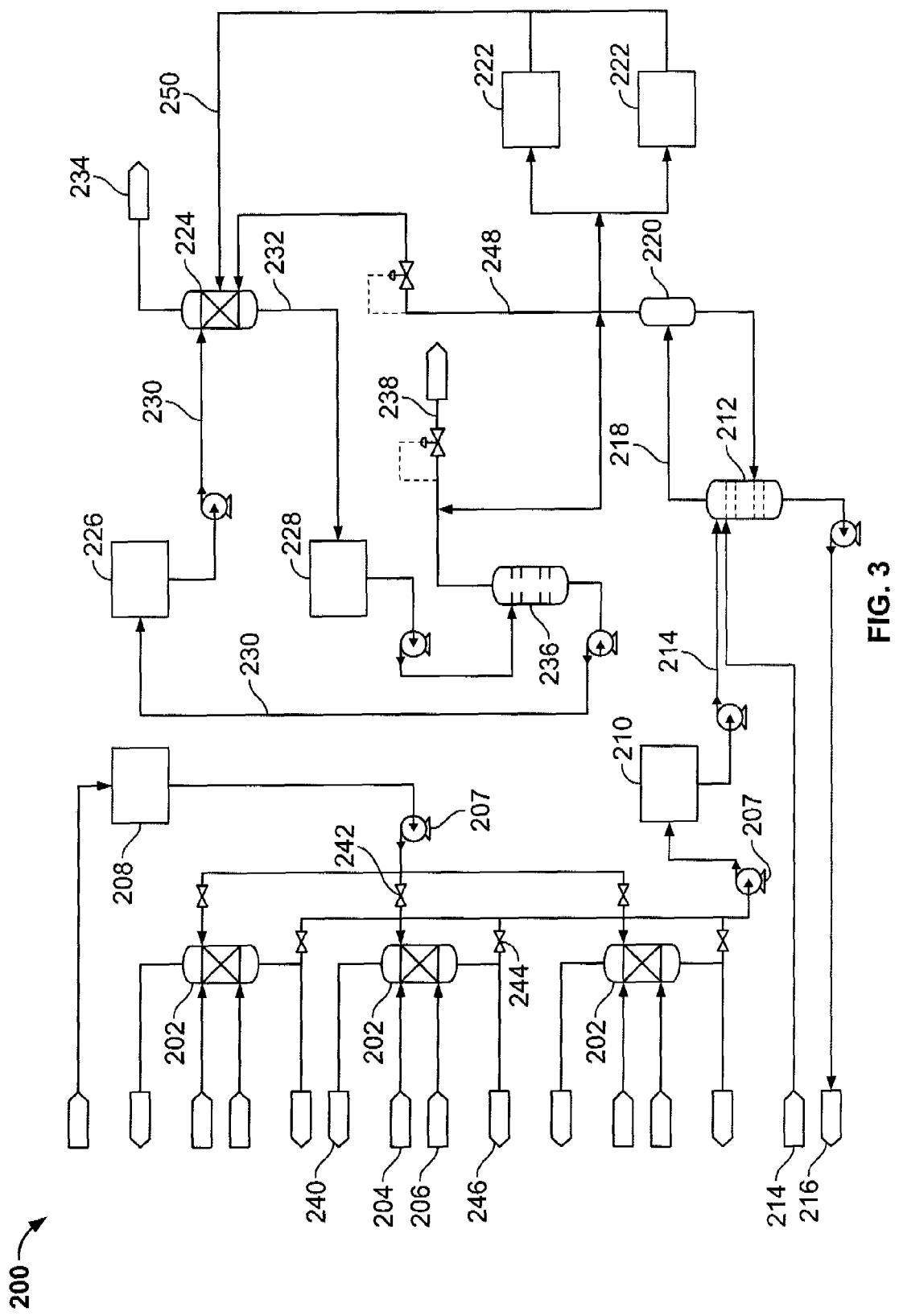
FIG. 3 is a schematic of an acid gas removal (AGR) system that may be used with the IGCC system shown in FIG. 2.

FIG. 3 is a schematic illustration of an acid gas removal (AGR) system 200 that may be used with IGCC 100 (shown in FIG. 2). In one embodiment, AGR 200 is designed to be used with an existing IGCC having an existing AGR. In the exemplary embodiment, AGR 200 includes three absorbers 202. In an alternative embodiment, AGR 200 includes more or less than three absorbers 202. Each absorber 202 receives an emissions lean solvent 204 and syngas 206 from the existing AGR. In the exemplary embodiment, absorbers 202 receive Selexol, which is used to remove hydrogen sulfide and carbonyl sulfide from the syngas, however alternative embodiments may use other solvents to remove emissions from the syngas. In the exemplary embodiment absorber 202 is an existing absorber that has been retrofitted with a start-up pump 207 that circulates solvent at atmospheric pressure within absorber 202. In an alternative embodiment, absorber 202 is a variable pressure absorber coupled to IGCC 100. A first emissions-lean solvent tank 208 is coupled in flow communication with absorber 202 and absorber 202 is coupled in flow communication with a first emissions-rich solvent tank 210.

A first stripper 212 is coupled downstream from both first emissions-rich solvent tank 210 and the existing AGR (i.e., AGR 106, shown in FIG. 2) such that first stripper 212 receives emissions-rich solvent 214 from both the existing AGR and from solvent tank 210. Stripper 212 produces an emissions-lean solvent 216 and gases 218. A knock-out drum 220 is coupled in flow communication with and downstream from first stripper 212. Alternatively, AGR 200 does not include a knock-out drum 220. Two sulfur recovery units (SRU) 222 are coupled downstream from drum 220. In an alternative embodiment, AGR 200 has more or less than two SRUs 222.

A second absorber 224 is also coupled downstream from and receives gases 218 from stripper 212. In the exemplary embodiment absorber 224 is a low pressure absorber, but is not limited to being a low-pressure absorber. Moreover, in the exemplary embodiment second absorber 224 is an additional component added to IGCC 100. Alternately, the second absorber 224 may be an existing absorber from a tail gas treating unit used with IGCC 100. Second absorber 224 is coupled in flow communication with both a second emissions-lean solvent tank 226 and a second emissions-rich solvent tank 228. Specifically, second absorber 224 receives emissions-lean second solvent 230 from second emissions-lean solvent tank 226 and discharges emissions-rich solvent 232 to second emissions-rich solvent tank 228. In an alternative embodiment wherein the solvent used in second absorber 224 is the same as the solvent used in first absorber 202, second absorber 224 receives emissions-lean solvent from first emissions-lean solvent tank 208 and discharges emissions-rich solvent to first emissions-rich solvent tank 210. As such, such an embodiment does not include second emissions-lean solvent tank 226 and second emissions-rich solvent tank 228. In the exemplary embodiment, emissions-lean second solvent 230 methyl diethanol amines (MDEA) is used to remove hydrogen sulfide, however other solvents may be used to reabsorb other emissions received from stripper 212 such as carbonyl sulfide. Gases 234 produced in absorber 224 are discharged to either a thermal oxidizer stack or a flare header (not shown).

A second stripper 236 is coupled in flow communication with second emissions-rich solvent tank 228. In the exemplary embodiments, stripper 236 is an additional component added to IGCC 100. In alternative embodiment, stripper 236 may be an existing stripper from a tail gas treating unit used with IGCC 100. Stripper 236 cycles emissions-lean solvent 230 back to solvent tank 226. Furthermore, second stripper 236 discharges gases to SRU 222 and discharges gas 238 to a flare header (not shown). As such, in the exemplary embodiment, absorber 224 and stripper 236 facilitate re-absorbing gases 218 from first stripper 212 and reabsorbing tail gas from 222. In alternative embodiments, absorber 224 and stripper 236 may be designed to only re-absorb gases 218 from first stripper 212.

During operation, absorber 202 receives syngas 206 from the existing gasification train, and start-up pump 207 channels lean solvent from solvent tank 208 into absorber 202. Pump 207 circulates lean solvent from lean solvent tank 208 through absorber 202 at atmospheric pressure. The atmospheric pressure within absorber 202 enables absorber 202 to receive emissions-rich syngas immediately upon start-up of the gasifiers.

The emissions-rich syngas and emissions-lean solvent mix in absorber 202 wherein emissions-lean syngas and emissions-rich solvent are produced. The emissions-lean syngas 240 is channeled from absorber 202 and used in turbine engine operations, and the emissions-rich solvent is channeled to tank 210. The emissions-rich solvent remains in tank 210 during start-up operating conditions such that no emissions are released to the atmosphere from the emissions-rich solvent.

During start-up operations, after emissions-rich solvent is channeled to tank 210, IGCC 100 can resume normal operations. During normal operations, syngas 206 and emissions-lean solvent 204 are channeled to absorber 202 from the existing gasification train. The flow from solvent tank 208 is prevented during normal operations using a valve 242. Syngas 206 and emissions-lean solvent 204 mix in absorber 202 producing emissions-lean syngas and emissions-rich first solvent. During this period of operation, flow to first emission-rich solvent tank 210 is also prevented using valve 244. As such, both the emissions-lean syngas 240 and the emissions-rich solvent 246 are returned to the existing system. Specifically, the emissions-lean syngas is used in turbine engine operations, and the emissions-rich solvent is returned to the exiting AGR.

As normal operating conditions continue, emissions-rich solvent 214 from the existing AGR is channeled into stripper 212. Within stripper 212 the emissions are removed from the emissions-rich solvent such that gases 218 are produced. Gases 218 are then channeled to knock-out drum 220 wherein any remaining solvent is also removed from gases 218. An increased pressure in knock-out drum 220 causes remaining gases 218 to exit knock-out drum 220 and be channeled along path 248 to absorber 224 where the gases are re-absorbed.

Within absorber 224 the gases are mixed with a second emissions-lean solvent channeled from second emissions-lean solvent tank 226 to produce a emissions-rich solvent. Depending on solvent selection of tank 226 some gasses such as carbonyl sulfide may not be reabsorbed, creating additional gases. The additional gases are channeled to a thermal oxidizer or a flare header (not shown), and the emissions-rich solvent is channeled to second emissions-rich solvent tank 228 wherein the emissions-rich solvent is stored such that no emissions are released to the atmosphere from the emissions-rich solvent.

When sulfur recovery unit (SRU) 222 reaches a stable operating condition, the emissions-rich solvent stored in solvent tank 210 is channeled to stripper 212. Likewise, the emissions-rich solvent stored in solvent tank 228 is channeled to stripper 236. Both stripper 212 and stripper 236 produce gases which flow to SRU 222. Emissions-lean solvent 216 produced by stripper 212 is channeled to the existing AGR, and emissions-lean solvent 230 produced in stripper 236 is channeled to second emissions-lean solvent tank 226 where it can be reused by absorber 224. Further, gases within SRU 222 are channeled back to absorber 224 through path 250.

If SRU 222 trips offline, gas flow to SRU 222 is diverted to absorber 224 such that any potential emissions are stored within second emissions-rich solvent tank 228. Emissions are stored within tank 228 until SRU 222 reaches proper operating conditions. As such, emissions are stored within the AGR and not released into the atmosphere, as is common during an SRU trip. Moreover, during a gasifier trip or gasifier shutdown, emissions are stored within first emissions-rich solvent tank 210 until they can be sent to SRU 222 via stripper 212. As such, emissions stored in first emissions-rich solvent tank 210, likewise, are not released into the atmosphere.

In an alternative embodiment, IGCC 100 include a recycle compressor coupled in flow communication with second absorber 224. The recycle compressor compresses emission gases to a required pressure such that the emissions gases can be recycled back to gasification trains 102 or enter second absorber 224 for re-absorption and storage in second emissions-rich solvent tank 228. In another alternative embodiment, IGCC 100 includes an $H_2S$ concentrator coupled in flow communication with second absorber 224.

The above-described methods and apparatus permit start up of an IGCC with minimal emissions. Specifically, emissions produced during start up are initially stored in the first emissions-rich solvent tank until all of the systems within the IGCC reach stable operating conditions. When all systems are stable the emissions are allowed to continue through their normal flow path. Furthermore, the above-described methods and apparatus facilitate reducing the number of emissions produced during an equipment failure or shutdown. This is achieved through re-absorption. Specifically, during an equipment failure, gases can be diverted to either the first emissions-rich solvent tank or the second emissions-rich solvent tank for storage. These gases can be stored in the tanks for substantial periods of time during which no emissions are released into the atmosphere. When the IGCC is operating properly again or restarted, the emissions can resume their normal flow path.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of an acid gas removal system (AGR) for an integrated gasification combined cycle (IGCC), it is understood that the apparatus and methods are not limited to AGRs or IGCCs. Likewise, the AGR components illustrated are not limited to the specific embodiments described herein, but rather, components of the AGR can be utilized independently and separately from other components described herein.

While the invention has been described in terms of various specific embodiments, those skilled in the art will recognize that the invention can be practiced with modification within the spirit and scope of the claims.

What is claimed is:

1. A gas removal system for an integrated gasification combined cycle, said gas removal system comprising:
   at least one start-up pump configured to operate at a first pressure;
   a first absorber coupled to said at least one start-up pump, said first absorber configured to operate from the first pressure to a second higher pressure;

a first rich solvent tank coupled to said first absorber, said first rich solvent tank configured to receive a first emissions-rich solvent discharged from said first absorber during start-up operation of the integrated gasification combined cycle;

a first stripper coupled to said first rich solvent tank, said first stripper configured to facilitate removing gases from the first emissions-rich solvent;

a second absorber configured to receive gases removed from the first emissions-rich solvent to create a second emissions-rich solvent, wherein said second absorber comprises a tail gas treating unit; and a second rich solvent tank configured to store the second emissions-rich solvent.

2. A gas removal system in accordance with claim 1 further comprising a second stripper configured to facilitate removing gases from the second emissions-rich solvent.

3. A gas removal system in accordance with claim 2 further comprising:

a first lean solvent tank coupled to said at least one start-up pump and configured to store a first emissions-lean solvent at the first pressure for use with startup operations of the integrated gasification combined cycle; and a second lean solvent tank configured to store a solvent discharged by said second stripper.

4. A gas removal system in accordance with claim 2 wherein said first and second strippers discharge gases to at least one sulfur recovery unit.

5. A gas removal system in accordance with claim 1 further comprising at least one variable pressure absorber configured to discharge solvent to said first rich solvent tank.

6. A gas removal system in accordance with claim 1 further comprising at least one of a recycling compressor and a hydrogen sulfide concentrator coupled in flow communication with said at least one second absorber.

7. An integrated gasification combined cycle comprising:
a gasifier; and
a gas removal system comprising:
at least one start-up pump configured to operate at a first pressure;
at least one first absorber coupled to said at least one start-up pump and operable from the first pressure to a second higher pressure;

a first rich solvent tank coupled to said at least one first absorber, said first rich solvent tank configured to receive a first emissions-rich solvent discharged from said integrated gasification combined cycle at the first pressure during start-up operation of said integrated gasification combined cycle;

a first stripper coupled to said first rich solvent tank, said first stripper configured to facilitate removing gases from the first emissions-rich solvent;

a second absorber configured to receive gases removed from the first emissions-rich solvent to create a second emissions-rich solvent, wherein said second absorber comprises a tail gas treating unit; and a second rich solvent tank configured to store the second emissions-rich solvent.

8. An integrated gasification combined cycle in accordance with claim 7 further comprising at least one sulfur recovery unit, said gas removal system further comprises a second stripper configured to remove gases from the second emissions-rich solvent, said first and second strippers are configured to discharge gases to said at least one sulfur recovery unit.

9. An integrated gasification combined cycle in accordance with claim 8 wherein said gas removal system further comprises:

a first lean solvent tank coupled to said at least one start-up pump and configured to store a first emissions-lean solvent at the first pressure for use with startup operations of said integrated gasification combined cycle; and a second lean solvent tank configured to store a solvent discharged by a second stripper.

10. An integrated gasification combined cycle in accordance with claim 7 further at least one variable pressure absorber configured to discharge solvent to said first rich solvent tank.

11. An integrated gasification combined cycle in accordance with claim 7 further comprising at least one of a recycling compressor and a hydrogen sulfide concentrator coupled in flow communication with said at least one second absorber.

* * * * *